(12) United States Patent
Klein et al.

(10) Patent No.: US 7,406,659 B2
(45) Date of Patent: Jul. 29, 2008

(54) SMART LINKS

(75) Inventors: Adrian Conor Klein, Seattle, WA (US); Marcelo Aizenstein Furman Calbucci, Redmond, WA (US); Jerald Lee Hittle, Woodville, WA (US); Ramez Naam, Seattle, WA (US); Jeffrey Carey Reynar, Woodinville, WA (US); Ziyi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 09/995,224

(22) Filed: Nov. 26, 2001

(65) Prior Publication Data

US 2003/0101413 A1    May 29, 2003

(51) Int. Cl.
*G06F 17/00* (2006.01)
(52) U.S. Cl. ...................................... 715/273; 715/234
(58) Field of Classification Search ................. 715/526, 715/901, 501.1, 513, 273, 234
See application file for complete search history.

(56) References Cited

U.S. PATENT DOCUMENTS

| | | | |
|---|---|---|---|
| 5,895,461 A | 4/1999 | De La Huerga et al. | 707/1 |
| 6,122,647 A * | 9/2000 | Horowitz et al. | 715/513 |
| 6,222,537 B1 * | 4/2001 | Smith et al. | 345/762 |
| 6,272,505 B1 | 8/2001 | De La Huerga | 707/501 |
| 6,308,171 B1 | 10/2001 | De La Huerga | 707/3 |
| 6,323,853 B1 | 11/2001 | Hedloy | 345/339 |
| 6,516,321 B1 | 2/2003 | De La Huerga | 707/102 |
| 2002/0010769 A1 * | 1/2002 | Kippenhan et al. | 709/223 |
| 2002/0052873 A1 * | 5/2002 | Delgado et al. | 707/7 |
| 2002/0069223 A1 * | 6/2002 | Goodisman et al. | 707/513 |
| 2002/0123912 A1 * | 9/2002 | Subramanian et al. | 705/5 |
| 2002/0143808 A1 * | 10/2002 | Miller et al. | 707/501.1 |
| 2002/0154162 A1 * | 10/2002 | Bhatia et al. | 345/745 |
| 2003/0080986 A1 * | 5/2003 | Baird | 345/700 |
| 2004/0078265 A1 * | 4/2004 | Subramanian et al. | 705/14 |

OTHER PUBLICATIONS

U.S. Appl. No. 09/907,418, filed Jul. 17, 2001, Reynar et al.

* cited by examiner

*Primary Examiner*—William L. Bashore
*Assistant Examiner*—Laurie Ries
(74) *Attorney, Agent, or Firm*—Woodcock Washburn LLP

(57) ABSTRACT

A system and methods to incorporate, distribute, and execute associated links in online content is provided. The invention contemplates client side processing of online content received from one or more cooperating content servers to incorporate associated links by a client side computing application for display to participating users. The associated links when interacted offer one or more actions including but not limited to offering additional relevant content, executing cooperating applications, and performing searches. The processing of the online content is accomplished by parsing the content and comparing the content with a predefined list of associated links. If a match occurs, the associated link is incorporated for use. The invention further contemplates the automated update of the predefined list of associated links.

2 Claims, 9 Drawing Sheets

SMART LINKS

FIELD OF THE INVENTION

The present invention relates to interactive content offered in computing environments. More particularly, to systems and methods that allow for the online integration and delivery of enhanced content through associated links.

BACKGROUND OF THE INVENTION

As online content delivery and interaction has become ubiquitous, online service providers have developed and are continuing to develop features to distinguish themselves from each other. From personalized content pages to highly interactive multi-media content, a variety of online features are currently being offered in the battle to attract new users and to retain existing users. These features are generally integrated within the offered content, however, some features may operate as independent applications (e.g. chat dialog boxes) that cooperate with offered content. These features are designed with the thought that in operation they engage participating users to request additional content.

Currently, several features are automatically integrated in offered content. These schemes have been implemented for automatically integrating associations for initiating these described online functions, features, and operations. Exemplary functions, features, and operations may include automatically addressing an e-mail message, performing a look up in a cooperating database, providing a hyperlink to one or more Internet web pages, and providing enhanced content.

One current scheme for employing an associated link involves user selection of individual words, phrases, or names in content offered by offline computing applications that is viewable on a display screen. In operation, a context sensitive menu is automatically provided to the user for the selected word, phrase, or name. However, the context sensitive menu is based on a predefined list of words, phrases and names that may be stored in a static data store cooperating with the offline computing application. For example, using this scheme, if a user selects the text "Barry Bonds" within generated or stored content, a short biography of the baseball player Barry Bonds may automatically be called up from a local, cooperating data file and displayed to the participating user. For words, phrases, or names not in the predefined list, when the user manually selects the word, phrase or name, this scheme may either initiate the execution of a cooperating application (e.g. online dictionary) but does not offer additional enhanced content.

The incorporation and execution of associated links in online content is generally realized through a string of communications between the computing application that displays the content (and corresponding associated links) and the content server housing and generating the desired content. In operation, content may be requested by a participating user through a computing application from a content server. The content server, in response, may aggregate relevant content for distribution to the requesting computing application. As part of request fulfillment, the content may be processed by the server before distribution to the requesting computing application to determine if associated links are to be incorporated into the content to be distributed. Stated differently, prior to distributing the aggregated and/or generated content to the requesting computing application, the content server may parse the content and compare the content to a list of predefined associated links to determine if these associated links are to be included in the distributed content. Additional communications subsequently occur between the computing application and the content server when participating users interact with offered associated links. These communications may result in a number of events including but not limited to the distribution of enhanced content, the execution of cooperating computing applications, the execution of a search feature, etc.

However, there are a number of limiting factors with current schemes to incorporate and execute associated links in online content. First, current schemes place a heavy burden on content servers to perform significant processing when offering associated links thereby draining valuable content server resources that may be better used to attend to additional content requests. Secondly, by having the content server process associated links, there is an increase in latency between the content request and request fulfillment. This latency directly impacts participating users' content navigation and interaction experiences. Lastly, current schemes don not allow for portability of content having associated links between cooperating client-side computing applications. That is, online content is generally displayed to participating users through a browser application. However, today's word-processing and email applications are now capable of displaying online content that was once viewable only on computer browser-type applications. In operation, these non-browser computing applications are capable of displaying and executing online content but are not in communication with the content server that offers the content. The online content may be imported into these non-browser type applications or in the case of an e-mail application may be included as part of an e-mail. In either event, under current schemes, associated links that would be displayable on browser-type computing applications are not displayable on non-browser-type computing applications as these latter type of computing applications are generally not in communication with the content servers processing such associated links.

Therefore it is appreciated that there exists a need for a system and methods that integrate and employ associated links in content that overcome the prior art.

SUMMARY OF THE INVENTION

The present invention provides a system and methods that allow for the integration, distribution, and execution of associated links in online content. In an illustrative implementation, the present invention contemplates an exemplary computing application comprising a helper object and an associated link data file. In operation, the computing application requests content from one or more cooperating content servers over a communications network. Upon receipt of the content, the computing application executes the helper object to parse the received content and compare against the associated link data file to determine if one or more associated links are to be incorporated into the received content to generate displayable content. After, comparison the generated displayable content is offered to display and interaction to participating users.

In operation, if an associated link is interacted with by participating users, one or more events may occur. Exemplary events may comprise the display of a dialog box offering interactive enhanced content, the execution of one or more cooperating computing applications, the execution of a search in one or more cooperating search engines, etc. Enhanced content that may be offered may comprise additional relevant content that is relevant to the subject matter of the associated link, additional associated links, and search features.

In addition to the just described benefits, other advantages of the present invention will become apparent from the detailed description which follows hereinafter when taken in conjunction with the accompanying drawing figures.

BRIEF DESCRIPTION OF THE DRAWINGS

The system and methods for the integration, display, and operation of associated links are further described with reference to the accompanying drawings in which.

DETAILED DESCRIPTION OF PREFERRED EMBODIMENTS

Overview

Figure 1:
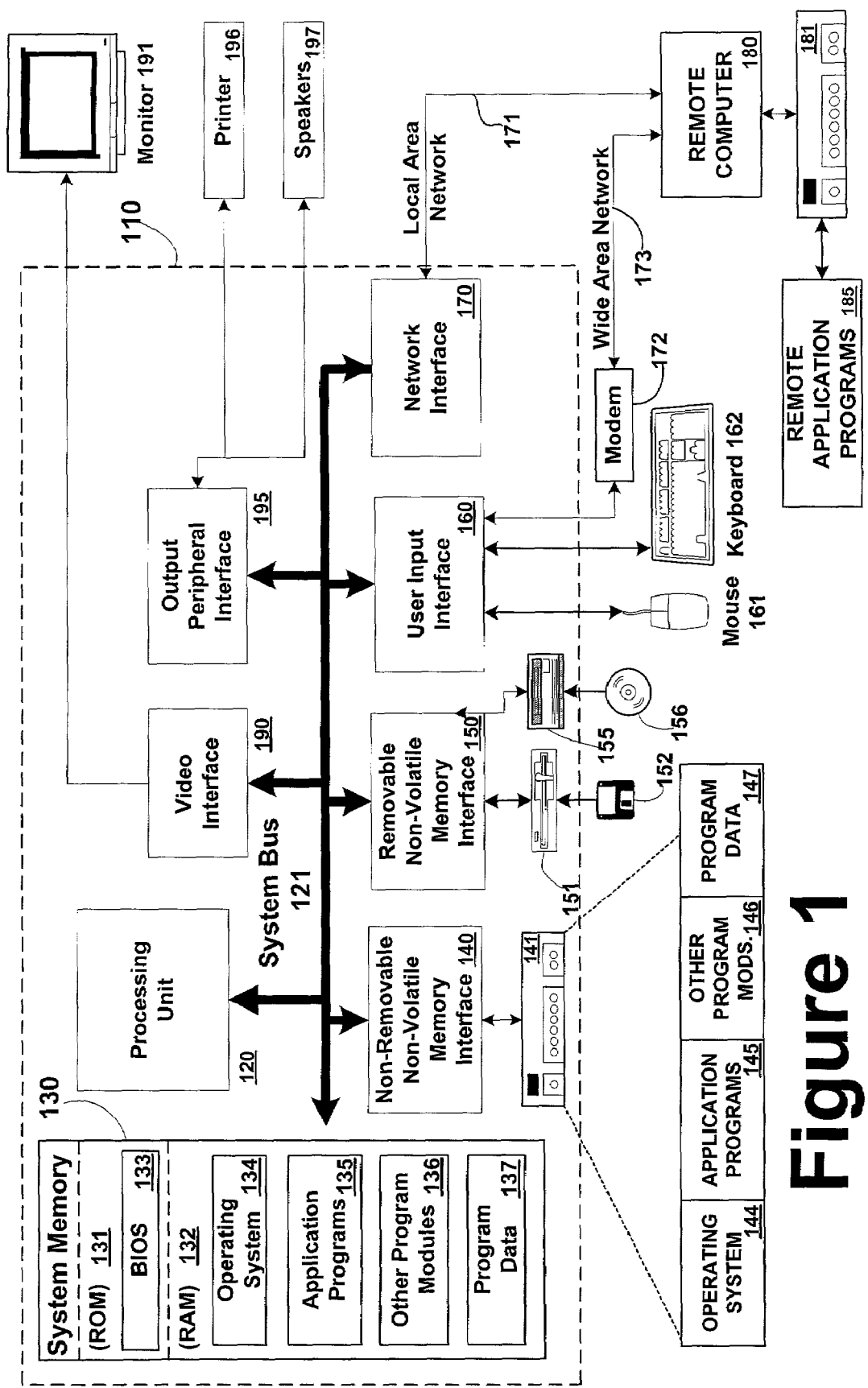
FIG. 1 is a block diagram representing an exemplary computing environment in which the present invention may be implemented.

The idea of incorporating links within content is well known. Hypertext, which may include Hypertext Markup Language (HTML), Extended Markup Language (XML), or other forms of Standard Generalized Markup Language (SGML), are common instruments used to link related computer files or pages. The original promise of hypertext was to let users move quickly and easily through a rich document space, tracing a chain of ideas from one domain to the next. At first, there seemed that there was not enough online content for these journeys to be either very long or very interesting. Resources were developed to help users locate the male islands of online content—such as Web directories. Today, there is more than enough content than any one person could ever hope to see, but a core issue still exits: finding content that is relevant to the requesting participating user. The Web directories of old have evolved into search engines, which have become the ubiquitous navigation mechanism for online content.

As more and more content is published, content providers have realized the importance of associating related content in a user-friendly form. This is accomplished by linking related content. Generally, however, there is little incentive for content authors to provide these links within their content; relying instead on content providers to offer this service. For example, if the Philadelphia Inquirer publishes an online story mentioning the appearance of Bruce Willis in a downtown restaurant, there is not much benefit to the Philadelphia Inquirer site if the author takes the time to link the Bruce Willis mentions to other Web sites about Bruce Willis. So generally, participating users of online content "surf" with one hand on the search engine remote.

Search engines, however, are not very handy. They cause an interruption in the "surfing" flow as the participating user most often is required to leave the online content they are currently navigating through to initiate a search. In addition, there is a lack of query context that makes search a harrying experience. Search engines are not going to be replaced however as they have become the command line for online environments. They serve their purpose as being a good starting point to find relevant content. However, there are a broad class of queries that may be better served through a link type interface.

Generally, content links are viscerally distinct from their surrounding text and/or content (e.g. usually appear having a different color and/or format). In operation, a participating user may interact with the link by simply selecting the link in offered content, e.g. by clicking on the link with a mouse or employing some other user interface. Beyond ordinary links, current computing applications are starting to take advantage of associated (or "smart") tags and links. These smart tags, unlike conventional hum-drum links, offer participating users the ability to streamline access to relevant tools and information. Prior to the display of requested content, the content is infused with associated links. The associated links are distinguishable from ordinary links as they take on differing colors or formats that ordinary links. As a participating user navigates through desired content, associated links are interacted with triggering one or more events. These events may include the delivery of additional content, the delivery of additional associated links, execution of one ore more cooperating applications, the initiation of a search on one or more cooperating search engines, etc.

In an exemplary implementation, as a participating user navigates online content in a computing environment, some words and key phrases may be highlighted to indicate that they are associated links. These associated links operate such that when participating users "hover" over them (with some type of user interface—e.g. a mouse or other pointing device), a short list of actions related to that phrase are displayed (e.g. a dialog box or menu-style box is displayed listing these related actions) to the participating users that when chosen execute a number of various operations. These actions may include but are not limited to requesting additional relevant content, initiating a search, executing cooperating computing applications, and requesting additional associated links.

Current schemes allow for the incorporation and execution of associated links. These schemes generally rely on content servers aggregating and/or generating content having associated links for distribution to requesting client computing applications. As part of request fulfillment, the offered content is parsed by the content server to determine if associated links are to be incorporated into the displayable content that is ultimately displayed to participating users. These schemes are lacking as they place a heavy burden valuable content server resources; resources that may be better utilized to attend to content request fulfillment. This burden is directly felt by participating users as there is an increase in latency between request for content and content fulfillment.

The present invention aims to ameliorate the shortcomings of the current approaches to the incorporation and execution of associated links by offering a system and methods that rely on client-side processing. In doing so, the content server is less taxed resulting in more efficient delivery of desired content. In addition, by shifting the processing of associated links on the client side, portability of online content may be realized resulting in sharing of content across varying types of computing applications.

Exemplary Operating Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Network Environments

One of ordinary skill in the art can appreciate that a computer 100 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 2:
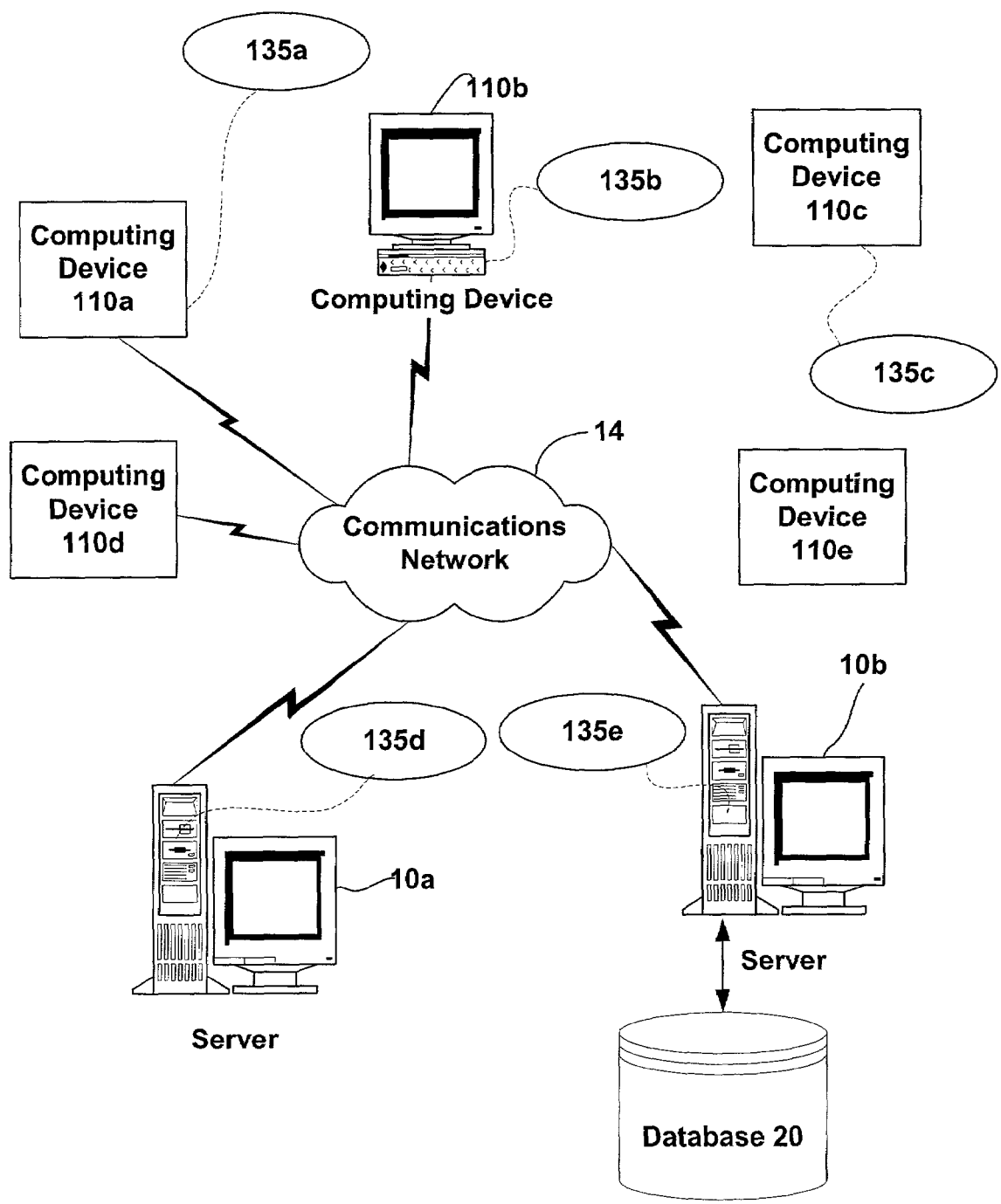
FIG. 2 is a block diagram representing an exemplary computing network environment in which the present invention may be implemented.

FIG. 2 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Associated Links

Figure 3:
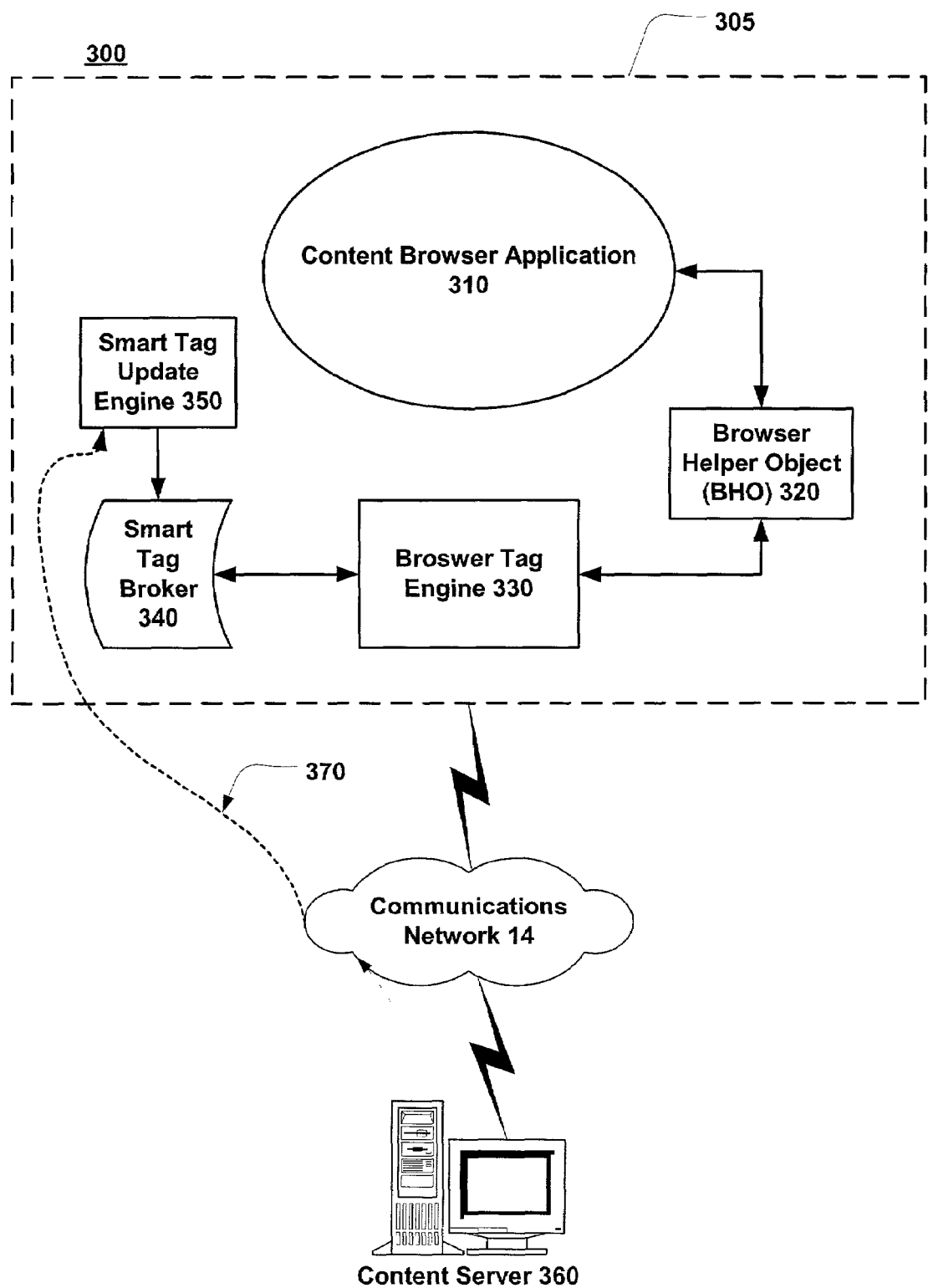
FIG. 3 is a block diagram of exemplary components and their cooperation of a system that integrates, displays, and operates associated links in accordance with the present invention.

FIG. 3 shows the cooperation of system components employed to realize associated link functionality for online content. As shown, system 300 comprises a client side operational block 305. Contained within client side operational block 305 is content browser computing application 310, browser helper object 320, browser tag engine 330, smart tag broker 340 and smart tag update engine 350. Client side operational block 205 communicates with content server 360 over communications network 14 such that data may be freely communicated between content browser computing application 310 and content server 360.

In operation, participating users (not shown) cooperate with content browser computing application 310 to request content. Computing application passes the content request over communications network 14 to content server 360. In response, content server 360 aggregates and/or generates (dynamically) content to satisfy the content request. The aggregated content is then communicated to content browser computing application 310 for display to participating users (not shown). Content browser computing application 310 processes the aggregated content using browser tag engine 330 and smart tag broker 340. Browser helper object 320 parses the aggregated content received from content server 360 to determine if any associated links are to be incorporated into the aggregated content. In addition to parsing the received aggregated content, browser tag engine 330 compares the content with a predefined list of key-phrases and/or syntactic rules for recognizing key-phrase candidates that are stored in smart tag broker 340.

Client side operational block 305 is also capable of performing an update function to update smart tag broker 340 with the most current list of predefined associated links. Upon the passing of some predefined event (e.g. time, use, etc), client operational block 305 cooperates with content server 360 to obtain updated content for smart tag broker 340. The smart tag broker 340 communicates with the server (e.g. content server 360) having the updated smart tag server information through smart tag update engine 350. The data flow path is demarcated by dotted lines 370. It should be noted that although the exemplary illustration shows the updated smart tag server information residing on content server 360 and the smart tag update engine 350 operating independent of content browser computing application 310, the present invention contemplates various scenarios where the smart tag server information resides on one or more different servers connected to communications network 14 and where the update is controlled by content browser computing application 310.

In an illustrative implementation, client side operational block 305 comprises MICROSOFT® Corporation's INTERNET EXPLORER® (IE) content browser computing application cooperating with MICROSOFT® Browser Helper Object (BHO) and MICROSOFT® Smart Tags Recognizer Engine. The MICROSOFT® Tag Recognizer is better described in co-pending U.S. patent application Ser. No. 09/907,418, entitled, "METHOD AND SYSTEM FOR DEFINING SEMANTIC CATEGORIES AND ACTIONS", filed Jul. 17, 2001, which is herein incorporated by reference in its entirety. It is understood that although the MICROSOFT® INTERNET EXPLORER® is used to describe some operations of the invention, that such browser is merely exemplary as the present invention contemplates the use of various browser-type computing applications capable of displaying online content and associated links.

Figure 4:
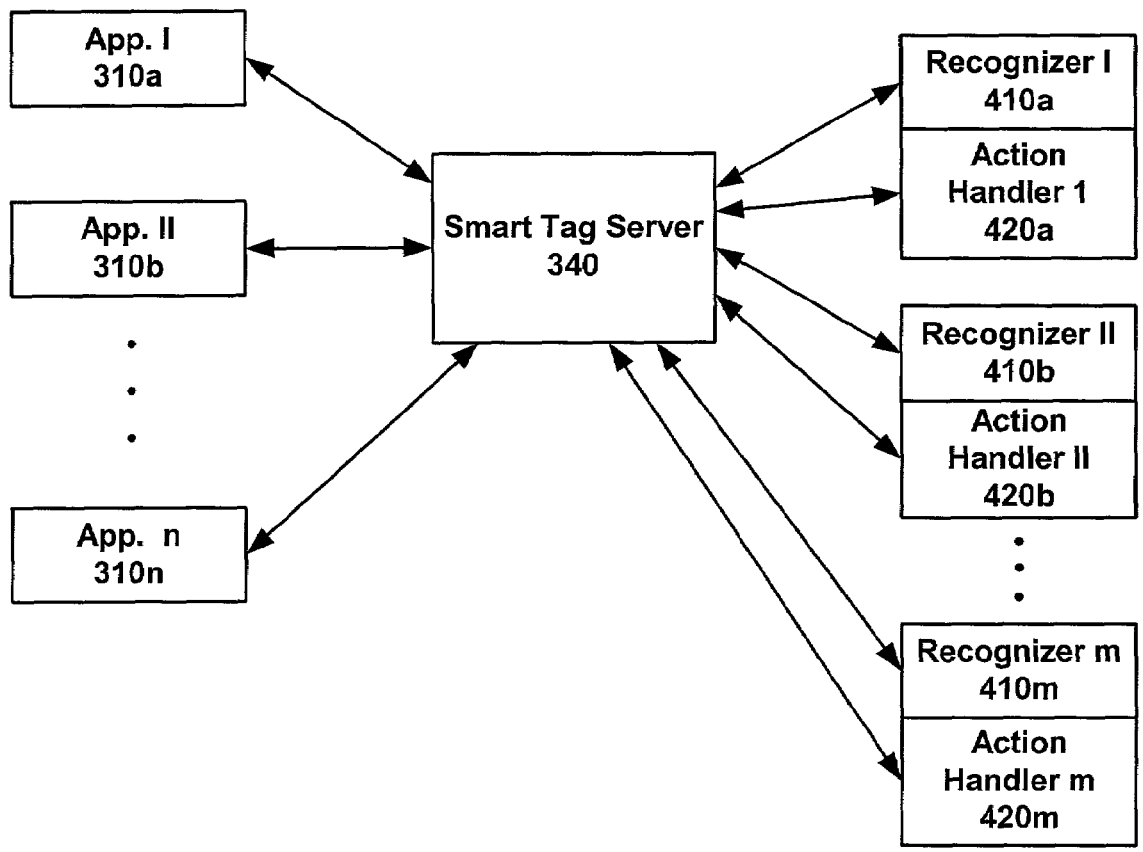
FIG. 4 is a block diagram further describing an exemplary component of the exemplary associated link system in accordance with the present invention.

FIG. 4 shows in more detail the components that comprise smart tag broker 340 of FIG. 3. As shown smart tag broker 340 is the broker between recognizers and action handlers to interface with applications. In operation, content browser computing application 310 sends a paragraph (e.g. content) to the smart tag broker 340. The paragraph is broken down into phrases and are sent to various recognizers 410*a*, 410*b*, . . . 410*m* depending on the number of phrases present. The recognizers process the phrase and return the strings that it recognizes and the string type. After all of the recognizers are finished processing, the smart tag server compiles a response with all the identified strings and types and notifies the content browser computing application. The string type can be considered a class. So for one instance, a "name recognizer" might recognize content that is related to persons' names (e.g. Full Name, First Name, Last Name, etc). Each one of these name related characteristics could be a class in itself. An action handler can be assigned to one or more class, such that when a class is identified one or more actions are executed. For example, if a date (e.g. Oct. 31, 2001) is present in a paragraph, this phrase may be processed by a date-type recognizer and identified as a date class. Accordingly, an appropriate date action handler may be assigned to this phrase such that the following actions may be offered to participating users of the content browser computing application: Save date, Setup Reminder, Set Alarm for Date, etc.

In an illustrative implementation, recognizers (410*a* . . . 410*m*) and action handlers (420*a* . . . 420*b*) comprise one or more instruction sets that are capable of processing content in accordance with the above description. Content browser computing application relies on the interaction between browser helper object 320, browser tag engine 330 and smart tag broker 340 to incorporate and execute associated links.

Figure 5:
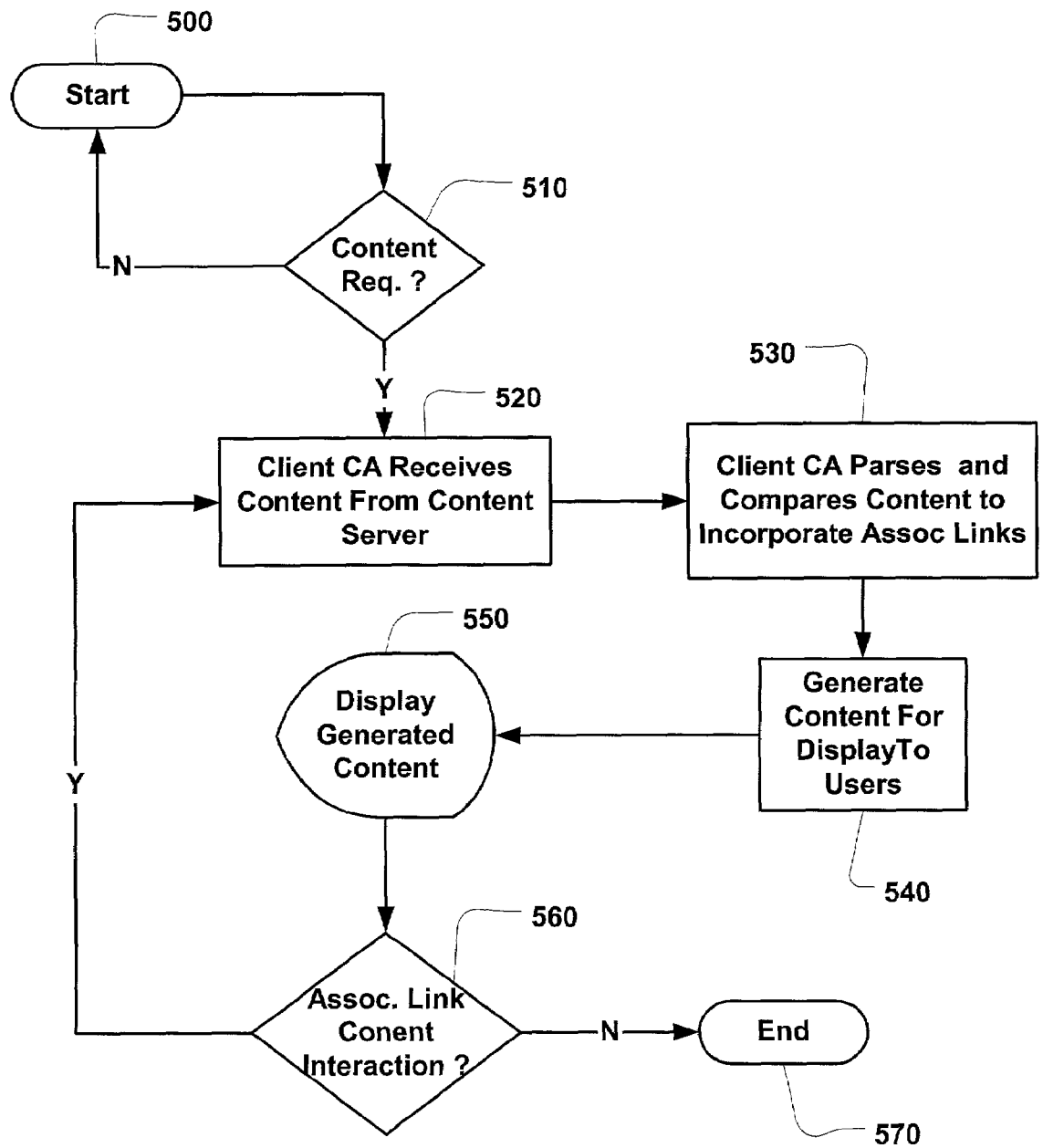
FIG. 5 is a flowchart diagram of the general processing performed to incorporate and execute associated links by an exemplary computing application in accordance with the present invention.

FIG. 5 shows the processing performed to deliver associated links in requested content. As shown, processing begins at block 500 and proceeds to block 510 where a check is performed to determine if content has been requested. If content has not been requested, processing reverts back to block 500 and proceeds from there. However, if content is requested, processing proceeds to block 520 where the requested content is received by cooperating client computing applications from one or more cooperating content servers. From there, processing proceeds to block 530 where the client computing application parsed the content to determine if any associated links are to be incorporated into displayable content. In addition to parsing the requested content, client computing application (e.g. 310 of FIG. 3) compares the received content with a predefined list of associated links to determine if any associated links are to be incorporated into the content that is ultimately displayed to participating users. From there, processing proceeds to block 540 where the content that is displayed to participating users is generated. Included in this content are any associated links. The generated content from block 550 is then displayed to participating user at block 550. A check is then performed at block 560 to determine if the generated content has had any interaction. If it is determined at block 560 that there is some interaction, processing reverts to block 520 and proceeds from there. Otherwise, processing terminates at block 570.

As mentioned parsing occurs once content has been requested. As part of operation, the present invention "listens" or monitors user activity. User activity is important as it provides triggers to process content that may contain associated links. In the exemplary illustration provided, the following user events are monitored: Before Navigating (specific content is requested—e.g. a specific URL has been requested), Download Complete (requested content has been transmitted), and Document Complete (content is loaded and ready on the browser). Current offered content is such that it creates multiple instances of a content browser with the exemplary content browser computing application (e.g. nested Web Browsers resulting from Web content having frames). In order to accommodate for this type of content, the present invention contemplates the use of two listeners which are controlled by the browser helper object (320 of FIG. 3). The first listener listens to the top browser instance (e.g. main window of MICROSOFT® INTERNET EXPLORER®). Generally, the top browser instance is fixed and is destroyed when closed. The second listener monitors individual browser events on a per browser state, so that events on each individual child browser may be detected. Events that happen on children browsers are propagated to the top browsers.

Figure 6:
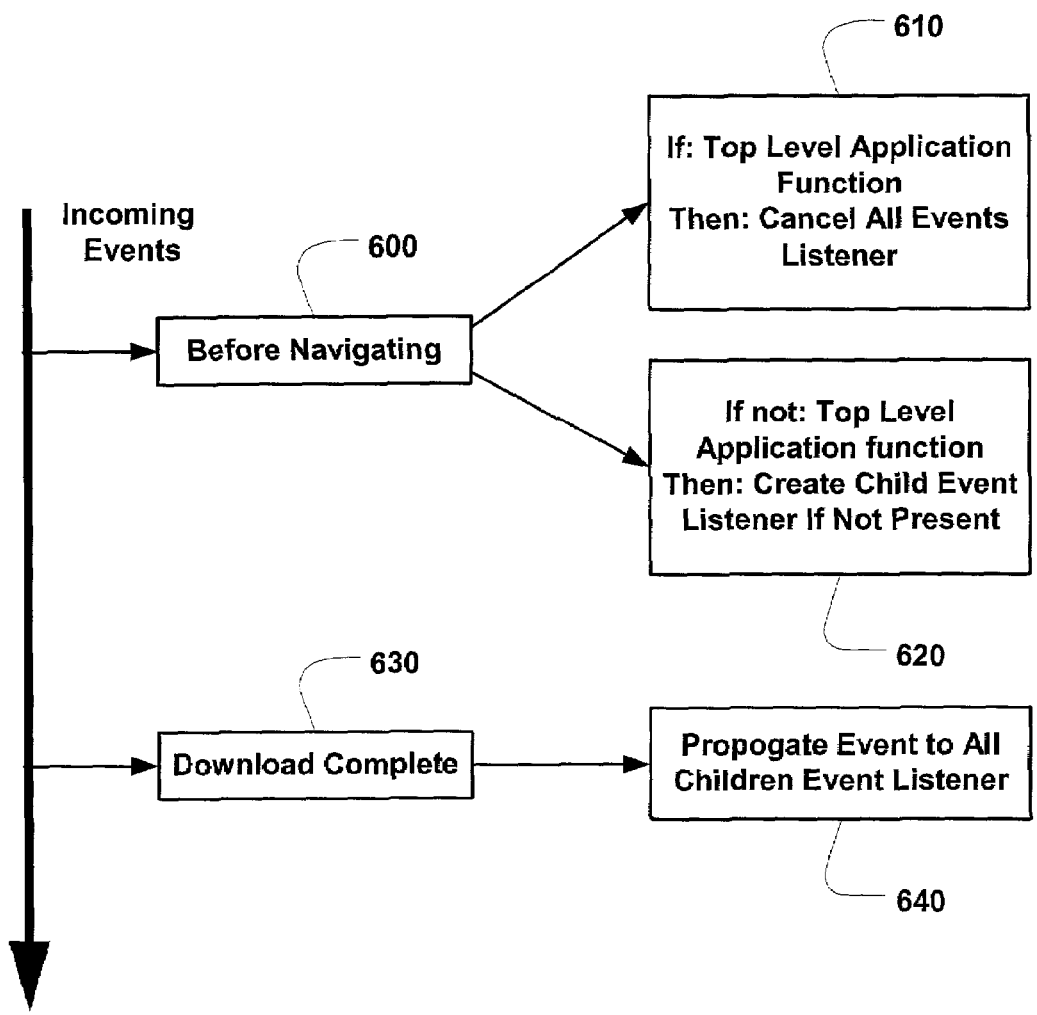
FIG. 6 is a block diagram further describing the steps performed when executing an associated link in accordance with the present invention.

FIG. 6 shows a block diagram of the processing performed by the first listener. As shown, incoming events are processed in line. If a Before Navigating event 600 is detected a check is performed at blocks 610 and 620 to determine if the Before Navigating event 600 is a top level browser event (e.g. user requested new content). If it is, all children event listeners are cancelled. If the Before Navigating 600 event is not a to level browser event (child browser being created—new content element of originally requested content) a child event listener is created. Alternatively, if the incoming event is a Download Complete 630 event, the event is propagated to all children event listeners at block 640.

Generally, the second listener listens for events on all children browsers as well as the top web browser. The aims of the second listener are to identify that a new page is ready to be parsed, and to cancel an ongoing parsing if content is disregarded (e.g., a Web page is destroyed.) Part of the second listener's responsibilities is, upon the detection of a refresh, to attach an On Unload event on the page. This event helps to identify refreshes so that content parsing may be controlled accordingly.

Figure 7:
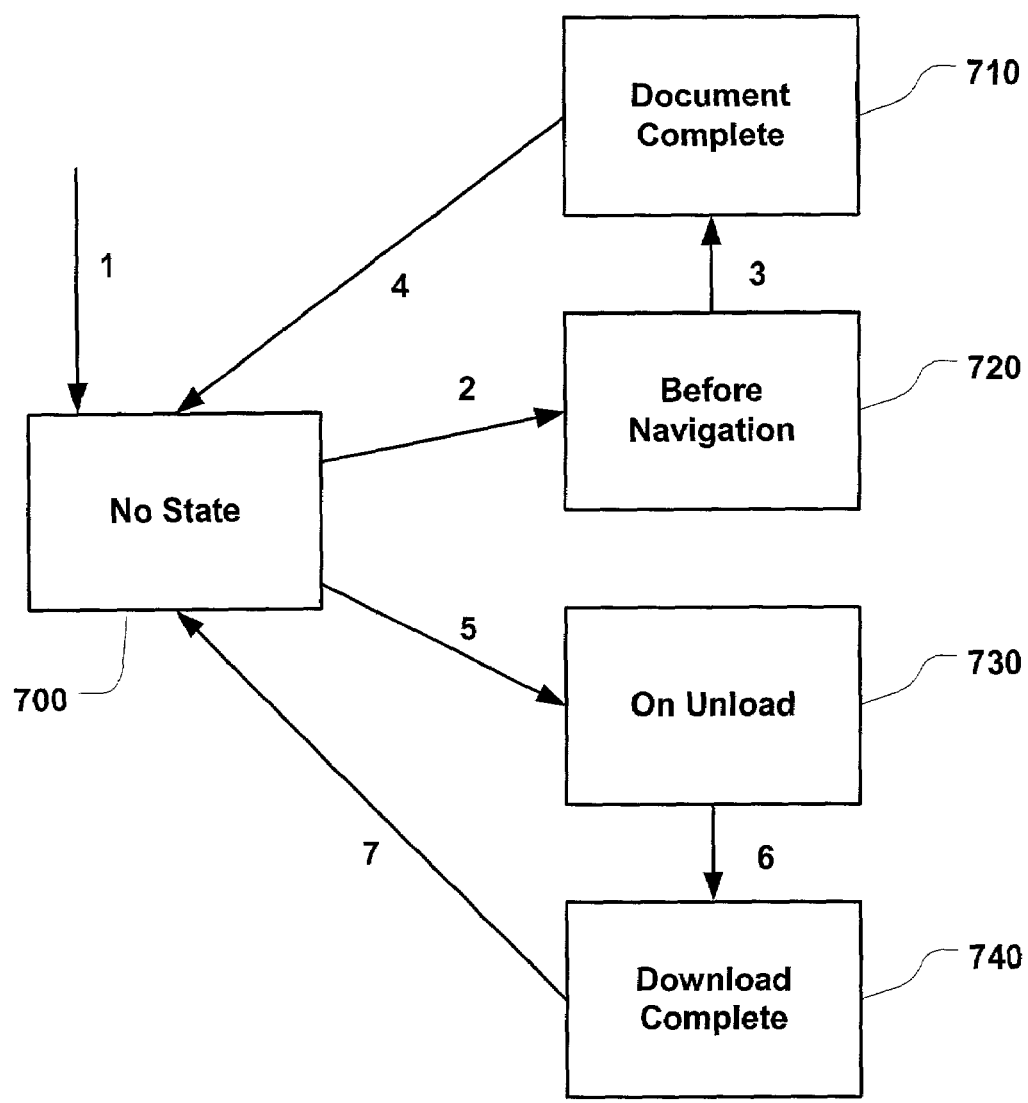
FIG. 7 is state diagram of the associated link system when executing associated links in accordance with the present invention.

FIG. 7 shows the state diagram showing the interaction of the first and second listeners used to parse requested content. The steps are delineated by the numbers 1-7 and the resultant states by element number 700-740. As shown in FIG. 7, the state diagram begins with step 1 at block 700 where content browser computing application (310 of FIG. 3) has not state. This may be considered the startup portion of the exemplary computing application. At step 2, content browser computing application proceeds to Before Navigation state at block 720. At this state, parsing is cancelled and all children frames are destroyed. From there, the state moves to step 3 where the content is received at block 710 indicating that the Document Complete event has transpired. At step 3, the content is parsed. Once parsed the state is reset at step 4 and processing reverts to block 700 where there is no state. The state machine being reset processing proceeds to the On Unload event at block 730. This stated is demarcated by step 5 where parsing is cancelled and all children frames listeners are destroyed. From the On Unload event processing proceeds to block 740 where the download is completed. This event is described by step 6 where the content is parsed. The state machine is then reset at step 7 and processing reverts to block 700.

Figure 8:
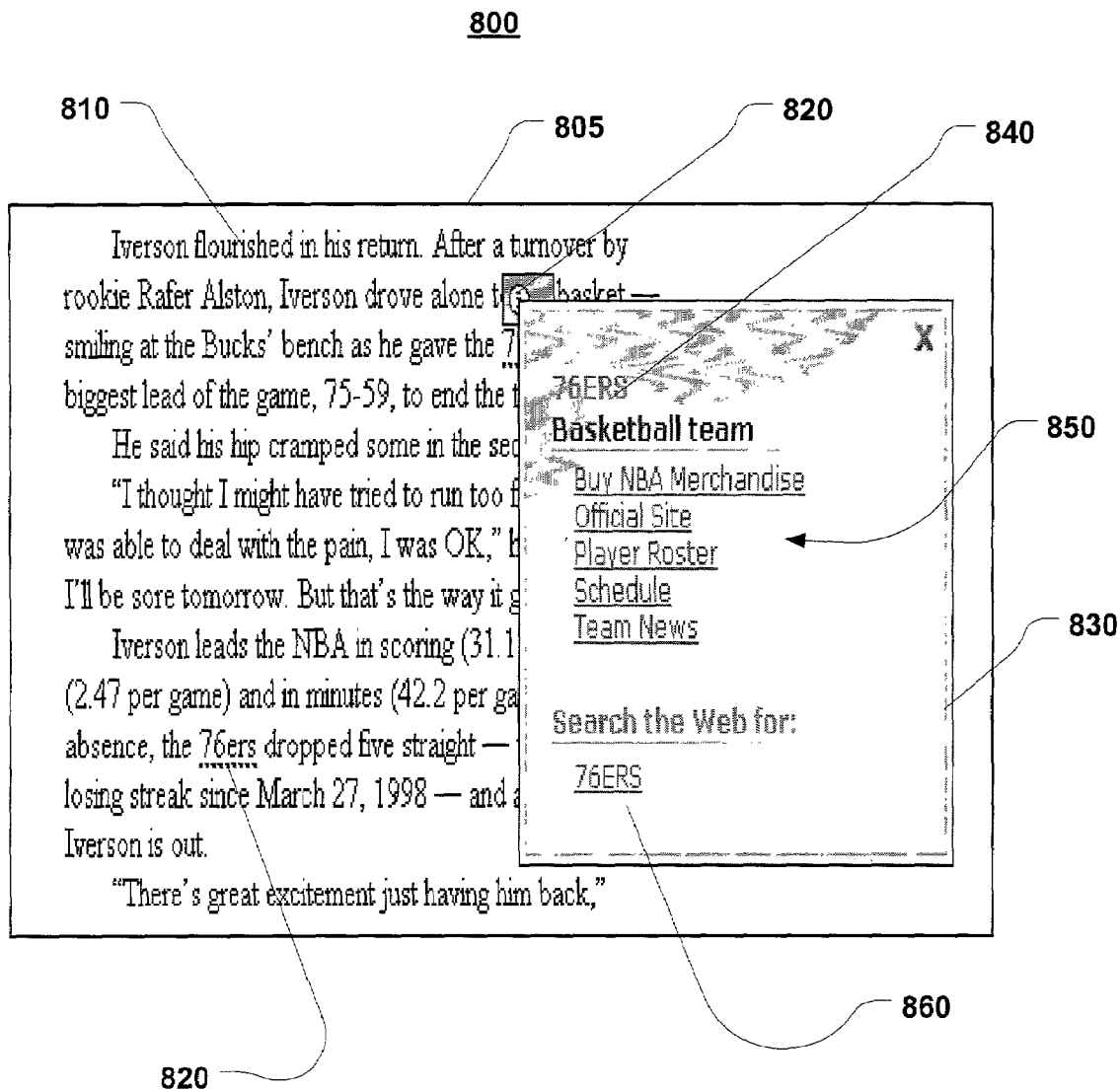
FIG. 8 is a block diagram of an exemplary screen shot of the exemplary computing application displaying associated links for interaction in accordance with the present invention.

FIG. 8 shows an exemplary screen shot of an exemplary computing application capable of displaying and executing associated links. As shown, exemplary computing application 800 maintains a first display pane 805 having a variety of content 810. Included in content 810 are associated links 820. Associated links 820 are distinguishable from surrounding content 810 in that they have different format and/or color. In the example provided, associated links 820 are underlined. In an exemplary operation, participating users (not shown) interact with associated links 820 through one ore more user interfaces (not shown). In that even, exemplary computing application 800 processes the interaction and displays associated link display pane 830. Associated link display pane 830 is capable of displaying and executing a variety of content and operations. In the example provided, associated link display pane 830 displays the name 840 of the associated link 820. In addition, associated link display pane 830 displays additional links 850. Additional links 850 are chosen so that they relate to the underlying interacted associated link 820. Furthermore, a search feature 860 is offered in associated link display pane 830 to allow participating users (not shown) the ability to search on one or more cooperating search engines for additional information relating to the underlying interacted associated link 820.

In this example, associated link 820 relates to the Philadelphia Seventy Sixers (76ers) basketball team. When interacted with, the associated link 820 triggers the generation of associated link display pane 830. Contained within associated link display pane 820 is the name of associated link 820—in this case 76ers, additional links that are related to the 76ers—e.g. a link to purchase NBA merchandise, a link to the official 76ers Web site, and links to view player rosters, schedules, and team news.

Figure 9:
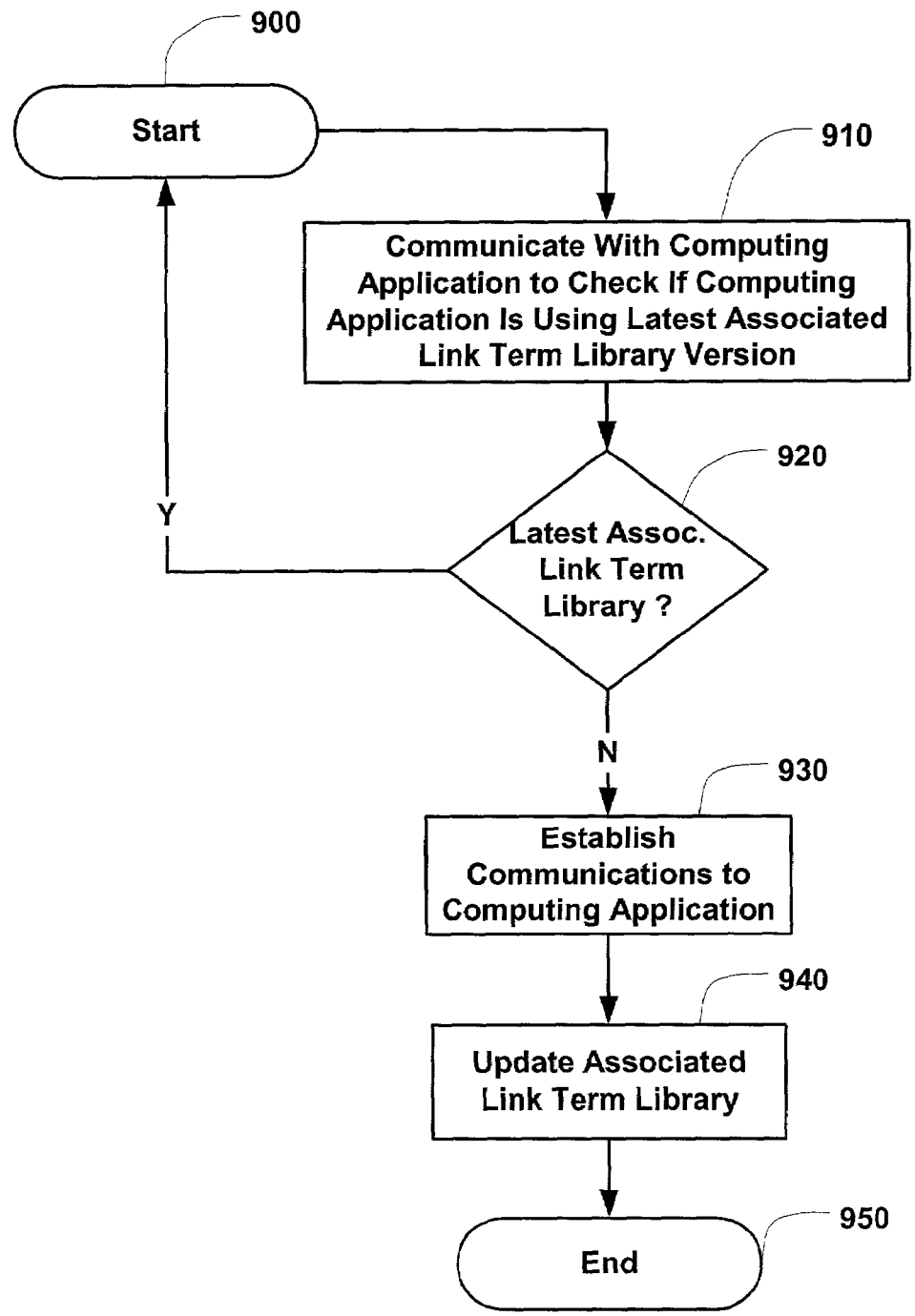
FIG. 9 is a flowchart diagram of the processing performed to update associated link files in accordance with the associated link system of the present invention.

FIG. 9 shows the processing performed to update the associated links data file. These updates can be scheduled according to a number of conventions including but not limited, periodic—every x months and event—creation of new associated link files. As shown, processing begins at block 900 and proceeds to block 910 where one or more content servers attempt to communicate with an exemplary computing application over a communications network (not shown) to determine if the computing application is employing the latest associated link data file version (i.e. the most current associated link data file). The check is then performed at block 920 to determine if the latest version is being used. If the latest version is being used, processing reverts back to block 900 and proceeds from there. However, if the check at block 920 shows that the latest version is not being used by the computing application, communications are established by one or more content servers with the cooperating client computing application at block 930. From there, the content server(s) performs an update on the associated link data file at block 940. Processing then terminates at block 950.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of music data, one skilled in the art will recognize that the present invention is not limited to the music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A system for providing associated links in content viewable by a computing application configured to operate on a local computer, said computing application configured to generate requests to a remote content server and receive content from the server, the system comprising:

at least one helper object embodied in at least one computer readable medium of the local computer and configured to operate on the local computer to parse received content locally, wherein said at least one helper object comprises a first listener and a second listener, at least one of said first and second listeners being configured to trigger parsing of received content, and wherein said first listener is configured to monitor and be responsive to a top level instance of the computing application and said second listener is configured to monitor and be responsive to a child instance of the computing application;

an associated links data file residing in the local computer; and at least one recognizer embodied in at least one computer readable medium of the local computer, said recognizer configured to receive said parsed content and compare the parsed content with data from the associated links data file and to identify candidate associated links for association with the received content, wherein said parsing and identifying is performed on the local computer.

2. The system as recited in claim 1, wherein said second listener is further configured to monitor and be responsive to the top level instance of the computing application.

\* \* \* \* \*